(No Model.)
F. W. CARPENTER.
TOY HORSE.
No. 274,270. Patented Mar. 20, 1883.
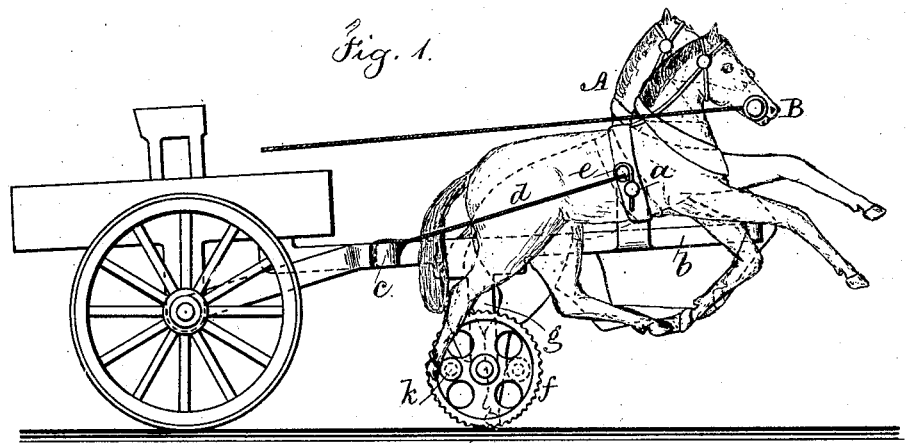
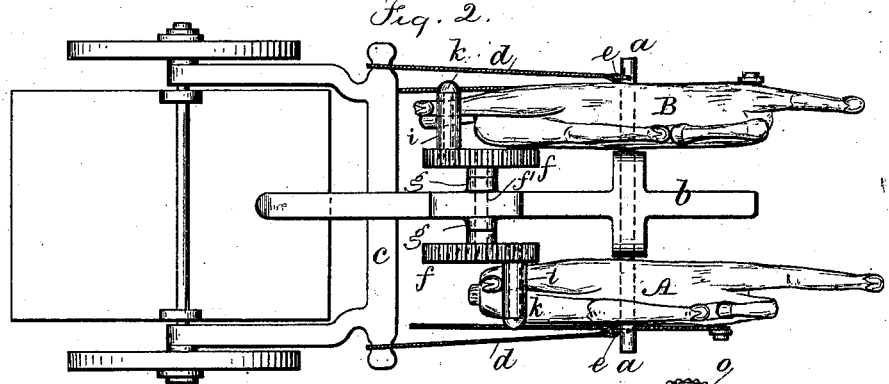
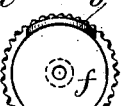
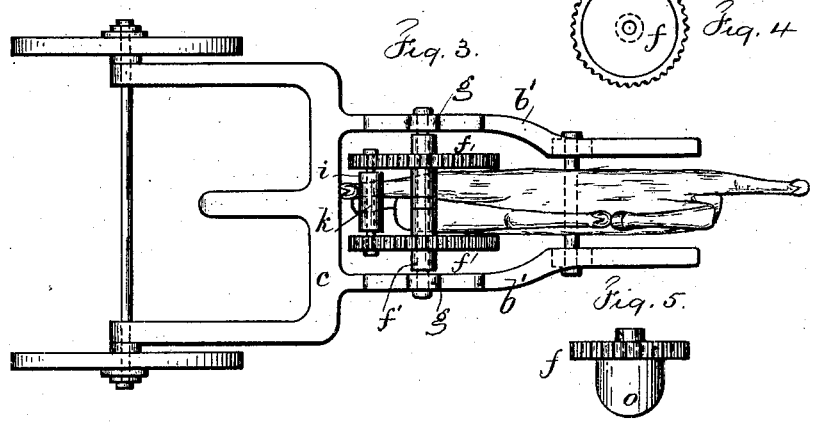
Witnesses
J. Hail
Chas. H. Smith
Inventor
Francis W. Carpenter
per Lemuel W. Serrell atty
N. PETERS, Photo-Lithographer, Washington, D. C.

UNITED STATES PATENT OFFICE.

FRANCIS W. CARPENTER, OF HARRISON, NEW YORK.

TOY HORSE.

SPECIFICATION forming part of Letters Patent No. 274,270, dated March 20, 1883.

Application filed January 29, 1883. (No model.)

*To all whom it may concern:*

Be it known that I, FRANCIS W. CARPENTER, of Harrison, in the county of Westchester and State of New York, have invented an Improvement in Toy Horses; and the following is declared to be a description of the same.

Letters Patent No. 241,188, heretofore granted to me, contains a pivoted toy horse to which an up-and-down movement is given through the medium of a wheel and a link and flexible connection to the head of the horse.

My present invention relates to a toy horse with a wheel or wheels mounted upon a shaft, and provided with a crank upon which I prefer to place a roller, and said wheel is in such a position that its crank-pin and roller act upon the leg of the horse as the wheel and horse are drawn along, and lift the rear part of the horse and then allow it to descend by its own weight, the rear part of the horse being the heaviest, and the motion thus imparted is similar to the cantering action of a horse. The hind feet of the horses in this case preferably do not touch the ground, the back leg continually resting upon the crank-pin from which it receives its motion.

In the drawings, Figure 1 is an elevation of two toy horses and the cart. Fig. 2 is an inverted plan of the same. Fig. 3 is an inverted plan of a modified form of my device adapted to the shafts of a one-horse vehicle. Fig. 4 is an elevation of a modified form of wheel employing an eccentric disk instead of a crank-pin, and Fig. 5 is a plan of the same.

The horses A B are pivoted upon the wire $a$, which is secured in the tongue $b$ of the wagon, and said tongue is provided with the usual cross-bar, $c$. These parts may be similar to those in patents heretofore granted to me. I prefer to fasten said pivot-wire $a$ to the tongue by a pin passing through a hole.

The cords $d$ $d$ represent traces, and these are attached at the back ends of the cross-bar $c$ and at their front ends to rings formed on the ends of pieces of wire, $e$, that are inserted in holes in the pivot-wire $a$, and serve to keep the horses in place upon said wire.

The wheels $ff$ are preferably made with teeth around their peripheries to insure their rotation when drawn over the floor, and the axle $f'$ for said wheels passes through a standard, $g$, which preferably is below and formed with or secured to the tongue $b$. These wheels are independent of each other, and each wheel is provided with a crank-pin, $k$. Each crank-pin $k$ is preferably made with a head at its outer end, and a small piece of rubber tubing, $i$; but a tube of brass or a roller of wood may be used in its place. The hind legs of the horses are at an inclination and rest upon the tubes $i$ of the crank-pins $k$, and as the horses and wagon are drawn along the wheels $f$ are revolved, and the crank-pins $k$ act against the legs and raise the horses, and their descent is in consequence of the greater weight of their rear ends, the legs resting upon the crank-pin and following their downward movement, and this action is repeated as the wheels turn round. In adapting this movement to the shafts $b'$ of a one-horse vehicle, the standard $g$ may be attached to one side of the shafts; but I prefer to use the devices shown in Fig. 3, wherein two standards $g$ are employed, each similar to the standard $g$ shown in Figs. 1 and 2. The axle $f'$ is secured to said standard or standards $g$, and carries either one or two wheels $f$, preferably with roughened edges. Where two wheels are used, they are connected by the crank-pin $k$, which is surrounded by a tube or roller, as heretofore described. Between the hubs of the wheels, and surrounding the axle $f'$, I prefer to put a piece of rubber tubing or a roller of wood. The hind leg of the horse falls against this during the revolution of the parts. The motion of raising the hind part of the horse and allowing it to descend by its own weight is the same in this device as in the device illustrated in Figs. 1 and 2.

In Fig. 4 I have shown a modified form of the wheel $f$, wherein I employ a cam-projection, $o$, made with the wheel, instead of the crank-pin $k$ for raising the leg of the horse. The horse need not be pivoted so that one end is heavier than the other, as a spring might be applied to press the leg or other portion of the horse toward the crank; or the crank-pin may be in a slot or between two parts of the horse, so as to swing the horse first one way and then the other. If the crank-pin is made as part of a wire or other crank or axle, it performs the same duty and is the equivalent of the crank-pin shown. It is generally preferable to cause the crank-pin to act on the hind leg of the toy horse; but it may be made to act upon the front leg or legs, or some other part of the horse, the action in all cases being direct and without the intervention of a link, which has heretofore been used.

In the toy horses heretofore made it has been necessary to disconnect the horse from the crank or other actuating device, as well as to remove the pivot on which it swings, before the horse can be detached. In my present improvement this is unnecessary, as the horse simply rests against the moving part from which it receives its swinging motion.

I claim as my invention—

1. In a toy, the combination of a tongue, b, pivot-wire a, horses A and B, wheels f, and crank-pins k, substantially as described, for raising the rear parts of the horses and allowlowing them to descend by gravity, as set forth.

2. In a toy, the combination of a tongue, b, pivot a, horses A and B, standard g, wheels f, axle f', crank-pins k, and tubes or rollers i, substantially as described, for raising the rear parts of the horses and allowing them to descend by gravity, as set forth.

3. In a toy, the combination, with the horses A and B, the tongue b, pivot-wire a, and crossbar c, of the cords or traces, and the wires e for confining the horses in place, substantially as set forth.

4. In a toy, the combination of the shafts or tongue, toy horse, standards, axle, wheel, and crank-pin, substantially as described, for raising the rear of the horse and allowing it to fall, as set forth.

5. The wheel f, with toothed periphery and a crank-pin, in combination with a toy horse having one of the hind legs of the horse resting upon the crank-pin, whereby the rear of the horse is raised and allowed to descend by its own weight, as set forth.

6. In a toy, the combination, with a pivoted horse, of a wheel and a crank-pin or projection acting upon the horse to swing the same, substantially as set forth.

7. The combination, with a toy horse, of a pivot upon which it can swing, a wheel that is connected to the shafts or other device that sustains the pivot of the horse, and a crank-pin, eccentric, or equivalent device receiving its movement from the wheel, and against which a portion of the horse rests, and by which a swinging movement is given to such horse, substantially as specified.

8. A pivoted toy horse, in combination with a wheel and an axle beneath a tongue or shafts, and mechanism moved by the wheel to swing the horse without being connected with such horse, substantially as specified.

Signed by me this 27th day of January, A. D. 1883.

FRANCIS W. CARPENTER.

Witnesses:
HAROLD SERRELL,
GEO. T. PINCKNEY.